United States Patent [19]
Glass et al.

[11] 3,919,411
[45] Nov. 11, 1975

[54] INJECTABLE ADJUVANT AND COMPOSITIONS INCLUDING SUCH ADJUVANT

[75] Inventors: Max E. Glass; Stephen F. Donahue, both of Kansas City, Mo.; John T. Urton, Prairie Village; Arthur Carlson, Jr., Overland Park, both of Kans.

[73] Assignee: Bayvet Corporation, Shawnee Mission, Kans.

[22] Filed: Feb. 4, 1974

[21] Appl. No.: 439,092

Related U.S. Application Data

[63] Continuation-in-part of Ser. No. 222,282, Jan. 31, 1972, Pat. No. 3,790,665, which is a continuation-in-part of Ser. No. 707,671, Feb. 23, 1968, Pat. No. 3,639,577.

[52] U.S. Cl. .................. 424/81; 424/88; 424/89; 424/92
[51] Int. Cl. ................. A61K 23/00; A61K 27/00
[58] Field of Search .......................... 424/81, 88–92

[56] References Cited
UNITED STATES PATENTS

| | | | |
|---|---|---|---|
| 3,099,601 | 7/1963 | Davis et al. | 424/92 |
| 3,178,350 | 4/1965 | Lund | 424/89 X |
| 3,639,577 | 2/1972 | Urton et al. | 424/89 X |
| 3,790,665 | 2/1974 | Glass et al. | 424/89 X |

*Primary Examiner*—Shep K. Rose
*Attorney, Agent, or Firm*—Schmidt, Johnson, Hovey & Williams

[57] ABSTRACT

A medicinal composition comprising an injectable active substance or agent combined with a novel adjuvant therefor capable of enhancing the effect of the agent. The adjuvant in its preferred form includes a macromolecular synthetic resin complexing material such as an acrylic acid polymer cross-linked with a polyallyl saccharide, and an emulsion system therefor including a surfactant selected from the group consisting of nonionic and amphoteric nontoxic surfactants, and a water in oil or oil in water emulsion carrier. The adjuvant is useful with various medicinal agents including antigens, hormones or drug and serums of the type which will complex with the synthetic resin material, and the relative proportions of the adjuvant components can be varied over wide ranges without deleteriously affecting the performance thereof. The adjuvant also finds utility as a diluent for live modified vaccines to reconstitute or restore the same and provide sufficient circulating antibody titer for vaccinated animals.

30 Claims, No Drawings

INJECTABLE ADJUVANT AND COMPOSITIONS INCLUDING SUCH ADJUVANT

CROSS REFERENCE

This is a continuation-in-part of our copending application Ser. No. 222,282, filed Jan. 31, 1972 now U.S. Pat. No. 3,790,665 patented Feb. 5, 1974, and entitled INJECTABLE ADJUVANT, METHOD OF PREPARING SAME AND COMPOSITIONS INCLUDING SUCH ADJUVANT, which in turn was a continuation-in-part of our identically titled copending application Ser. No. 707,671, filed Feb. 23, 1968, now U.S. Pat. No. 3,639,577, issued Feb. 1, 1972.

This invention relates to an adjuvant system for injectable medicinal compositions and is directed to the preparation and provision of an adjuvant which will increase the residual effectiveness of various types of medicinal agents without producing toxic or undesirable side effects such as lesions or indurations. The adjuvant is especially useful with medicinal agents such as antigens, serums and other chemotherapeutic materials which contain N atoms.

The adjuvant hereof has the unique property of undergoing relatively slow but substantially complete dissociation in the host's tissues and at the same time causing the medicinal agent incorporated therewith to be released to the host substantially at the rate of dissociation and absorption of the adjuvant. Although the manner in which the adjuvant functions in vivo is not fully understood, it is believed that the adjuvant gives both a depot and a routing effect in combination. By virtue of the depot action, the rate at which the medicament is released is controlled and because of the routing effect, the agent is directed toward those areas of the host most favorable to its utilization.

It has long been known that the effectiveness of some injectable medicinal agents, and particularly materials such as immunogens, may be significantly increased when the agent is combined with an adjuvant which is capable of retarding the rate of release of active agent to the host's system. In this way an effect is obtained which is comparable to the administration of many small doses injected periodically at regular intervals. Thus, the term "adjuvant" in this context is used to designate a substance that operates as a binder, carrier or suspending vehicle for immunogens and other medicinal agents alone or in combination, the function of which is to increase the effectiveness of the agent or the immunogenic response from an immunogenic agent by virtue of the retardation and slowing down of the absorption of such immunogens or medicinal agents into the host's system while at the same time routing the agents to those areas where they are the most efficiently utilized. In this manner a significantly greater prophylactic or therapeutic activity is attained.

In the selection of such an adjuvant many factors must be taken into consideration to insure a retarded rate of release in the most efficient manner with minimum toxic, allergenic, and irritating or other undesirable effects imposed on the host. Thus, the adjuvant should not only be capable of slow dispersion and absorption in the host but preferably should bind the immunogen or medicinal agent and release the active material to the host over an extended period as the adjuvant composition itself is absorbed and dissociated by the host's system.

Furthermore, the final medicinal composition incorporating such an adjuvant should exhibit a high degree of pharmaceutical elegance, i.e., the composition should not agglomerate or otherwise lose its creaminess and other desirable physical characteristics over time. The latter factor is important primarily because potential customers tend to discriminate against medicinal compositions which have an unattractive shelf appearance, even though the efficacy of such products is undiminished.

As used herein, the term "medicinal agent" is employed in a broad sense and encompasses agents which are useful in the prevention, cure or alleviation of disease or the prevention of some physiological condition or occurrence such as pregnancy. As will be explained, the adjuvant system is most useful with medicinal agents of the type which contain N atoms.

A number of carriers for the general purposes outlined have been proposed in the past, and have included, e.g., metallic oxides (i.e., aluminum hydroxide), alum, inorganic chelates of salts, gelatins, various paraffin-type oils, synthesized resins, alginates, mucoid and polysaccharide compounds, caseinates, and blood-derived substances such as fibrin clots. None of these materials have been found entirely satisfactory because in certain instances they have adverse effects on the host, display undesirable pharmaceutical properties or the final composition utilizing the same lack the requisite pharmaceutical elegance.

Alum, the metallic oxides and chelates of salts have been associated with the production of sterile abcessess. Other researchers have claimed that it is doubtful if such chemicals are ever completely removed from the body through the host's natural processes, thus leaving an inorganic debris as a residuum. Moreover, while these salts and oxides appear to be low in toxicity, there exists the possibility that they may be phagocytized by the cells of the reticuloendothelial system (littoral cells and sinusoidal cells of the liver and spleen) as part of the insoluble debris. There is evidence that such debris may be physically harmful to the various filter mechanisms of the body, e.g., the liver, spleen and kidneys.

The synthesized oils and petroleum derivatives may be particularly undesirable, in spite of relatively slow dispersion thereof in the body, inasmuch as they frequently are broken down into aromatic hydrocarbons, which may, in fact, be carcinogenic. Furthermore, these substances have been found to be capable of producing sterile abcesses and also may never be completely eliminated by the body.

With respect to fully denatured animal-derived substances, such as gelatin, the primary objection thereto is not the deleterious effect of the substance on its host, but rather that dispersion of the gelatin from the site of injection throughout the body of the host may be too rapid to qualify as an efficient absorption retarding vehicle; hence a poor adjuvant. Thus, whenever gelatin is used as a carrier, the gelatin is usually pretreated with tanning agents or other inorganic compounds to retard rapid dispersion of the material throughout the body. These supplements may prove deleterious. The fate of such materials in the body of the host is not completely understood but the possibility exists that the formation of insoluble debris can result. Finally, with substances such as gelatin, which have a tendency to swell when introduced parenterally, and under in vivo conditions, unpleasant mechanical side effects including discomfort and swelling may be produced.

Because blood-derived fibrin substances have been found to elicit immune responses in the body of the host, use of such substances as adjuvants is undesirable because of immunogenic dangers. It is common knowledge that certain similarities exist in the fibrins, fibrinogens and thrombins derived from various species of animals thereby increasing the liklihood of immune or allergenic response when such materials are used. Although a few of the above described vehicles have been previously used or suggested as adjuvants, in part at least because of their attributes of relatively slow dispersion from the site of injection, they possess characteristics which make for poor control of their rate of intra-host dispersion.

In our copending applications there is broadly disclosed an adjuvant, method of preparing the same and compositions including such adjuvant. However, the claims of such application are in general limited to the working examples disclosed. The purpose of the present application is to disclose additional working examples of the invention to support broader claims and to delineate the full scope of the present discovery, particularly with regard to the broad spectrum of constituents employable in the emulsion systems thereof, and the ranges of use for such constituents.

It is, therefore, the primary object of this invention to provide an adjuvant for injectable medicinal agents which is operable to significantly increase the residual effectiveness of the medicinal agent in the composition without producing deleterious toxic, allergenic or antigenic responses, while nevertheless not detracting from the desirable creaminess, physical appearance and handling characteristics of the final medicinal compositions employing such adjuvants.

Another important object of the invention is to provide an improved injectable adjuvant for medicinal agents which does not have the attendant detrimental effects associated with previously known adjuvants and exhibits sufficient depot action to retard release of the active ingredient while at the same time performing a routing function to direct the released medicament to sites in the host's body where most effective use of the agent can take place.

A still further important object of the invention is to provide an injectable liquid substance having a medicinal agent therein of the type having N atoms and combined with an adjuvant therefor which is capable of increasing the residual effectiveness of the agent at least in part by virtue of the fact that the adjuvant includes a slowly utilizable macromolecular synthetic resin material capable of forming a complex with the medicinal agent at the N atoms thereon to tightly hold the agent and thereby only slowly release such agent in vivo substantially at the rate of dispersion and absorption of the complexing material.

Also an important object of the invention is to provide an adjuvant wherein is included an emulsion system for the synthetic resin complexing material which is not only capable of assuring complete dispersion of the material in the liquid portion of the injectable substance, but also serves a routing function to direct the released medicament to the most favorable sites for utilization thereof while at the same time being completely dispersible in and dissociatable by the host's system. As a corollary to the foregoing, the present invention also is concerned with adjuvants wherein the constituents of such emulsions systems (preferably oil and water with a suitable surfactent) can be varied over specific ranges without noticeably affecting the efficacy of the resulting adjuvant.

It is also an important object of the invention to provide an adjuvant including a synthetic resin complexing material as described wherein an ingredient may be included having amine groups reactable with remaining free hydroxyl and carboxyl groups on the complexing material to thus limit the ability of the material to bond to the host's tissues and thereby avoid any tendency for the resin to cause the formation of lesions and indurations at the area of injection.

Also an object of the invention is to provide an improved adjuvant especially useful in connection with protein and mucopolysaccharide immunogens by virtue of the utilization in the adjuvant formulation of a polymer of acrylic acid cross-linked with polyallyl sucrose and which is capable of complexing with the amine groups of an immunogen or other active agent having N atoms to cause the latter to be released to the host upon injection of the composition substantially at the rate of dispersion and dissociation of the resin material.

Also an object of the invention is to provide an injectable medicinal composition wherein the concentration of the medicinal agent in the formulation may be varied as desired without requiring significant changes in the adjuvant to accommodate different active agent concentrations.

A very important object of the invention is to provide an improved adjuvant for injectable medicinal compositions which not only controls the rate of release of the active agent at the site of injection but also functions to provide the effect of mobile depots of the medicinal agent or depots at sites other than the injection site, e.g., the cells of the macrophage and/or lympocyte series in the host's system. In addition, it is an object to provide an adjuvant as described wherein depot action is provided at the injection site by the viscosity of the adjuvant formulation. Thus, with an immunogen, the improved adjuvant makes possible a potentiated antibody response of the host's body to a single injection of an antigen.

Another important object of the invention is to provide an injectable immunological composition wherein the shelf stability, eye appeal, and protection against high and low temperature extremes are increased by virtue of the utilization of a cross-linked acrylic acid-polyallyl saccharide polymer capable of forming a complex with the antigenic agent. An incident of such complex formation is protection of the immunogen against deterioration caused by oxidizing or reducing agents, unfavorable temperature, or pH conditions and free radicals.

Since the adjuvant of the present invention is especially useful in connection with immunogens such as vaccines, injectable formulations of this type will be described first. As will be made clear hereinafter, other medicinal agents may be incorporated with the novel adjuvant composition and superior potentiated results obtained. However, for best performance, the medicinal agent should be of the type having N atoms available for bonding to certain constituents of the adjuvant. Exemplary of these materials are hormones, antigens, serums and chemotherapeutics.

The adjuvant is made up of two major systems. It includes: (a) a macromolecular synthetic resin and complexing material having free carboxyl and hydroxyl sites capable of bonding with the medicinal agent at the N atoms thereon to hold the agent to the resin; and an emulsion system for the synthetic resin complexing material and capable of assuring relatively complete dispersion of the resin in the liquid portion of a final complete injectable composition. Alternatively, an ingredient having amine groups which are capable of combining with the free carboxyl and hydroxyl groups which remain after combination of the resin with the medicinal agent may be included in the formulation if desired to limit the ability of the resin to bond to the host's tissues in those cases where the active agent has insufficient N available to tie up substantially all of the abailable bonding sites of the resin phase.

In its preferred form, the adjuvant comprises the combination of: Carbopol 934P, B. F. Goodrich Chemical Co., defined in the literature as a polymer of acrylic acid crosslinked with polyallyl sucrose; and an emulsifier containing either a nonionic or amphoteric, nontoxic surfactant or mixtures thereof in a water in oil or oil in water emulsion carrier. Admixture of the constituents under ambient conditions is the only procedure necessary to prepare the material.

Carbopol 934P is described in detail in U.S. Pat. No. 2,909,462 and although the polymer containing polyallyl sucrose is preferred, satisfactory results can also be obtained by using acrylic acid and polymers crosslinked with other equivalent polysaccharides. The letter P in Carbopol 934P is used to designate the pharmaceutical grade of the product. In certain formulations, Carbopol 941 gives somewhat better results and has a better overall appearance than Carbopol 934P. However, it is necessary to rather carefully determine that the free hydroxyl and carboxyl sites of the material have been loaded with N atoms, either from the active agent or an N atom containing additive, than is the case with Carbopol 934P to more effectively assure that irritation of the host's tissue at the injection site is avoided.

The emulsion system used with the polymer described above should be either a nontoxic, nonionic or nontoxic, amphoteric surfactant, or mixtures thereof in an oil in water or water in oil emulsion carrier. The nature of the emulsion carrier is somewhat dependent on the type or types of surfactants used. Variations of the proportions of the surfactant or surfactants is permissible but preferably should be chosen as to type and used in respective concentrations to give an HLB number within the range of about 1.8 to about 16.7. Where surfactants are used for dispersing oil in water, the final HLB number should be above 6. In the case where surfactants are used of the type for dispersing water in oil, the final HLB number should be below 6.

It has been discovered and confirmed by suitable test studies that the constituents of the water and oil emulsion systems hereof (which can form either water in oil or oil in water emulsions) may be varied over specific ranges without deleteriously affecting the desirable properties of the resultant emulsion. In general the nontoxic vegetable oil component must be about 25 percent by volume of the total system, with a maximum of about 85 volume percent. Similarly, the water content must at a minimum amount to about 14% by volume. In the case of surfactant, the amount required can broadly be defined as that amount necessary to produce a nontoxic, stable, injectable emulsion, given the relative amounts of oil and water being used. The term "toxic" in this context refers to the undesirable property of emulsions containing large amounts of surfactants which causes dermal irritations or the like in the host. For the general case, the amount of surfactant useable in the water and oil systems defined above has been determined to be from about 1 to 20 percent by volume. Surfactant levels above 20 percent have been found to produce unsatisfactory emulsions with possible toxic properties, while at less than 1% surfactant levels the required emulsion either fails to form or it is unsatisfactory for the intended use. Workers in the art will appreciate that routine testing may be required in order to optimize a given emulsion system for a particular usage in terms of the relative properties of water, oil and surfactant; however the ranges disclosed above will serve as a guideline in this respect and any such optimization will be well within the purview of the skilled artisan in this field.

Exemplary surfactants useful in carrying out the preferred concepts on this invention include nontoxic, nonionic surfactants available from the Industrial Chemicals Department of Atlas Powder Company, Wilmington, Delware, e.g. for oil in water emulsions: Tween 80 (polyoxethylene sorbitan monooleate — HLB 15) Arlacel 80 (sorbitan monooleate — HLB 4.3); Tween 20 (polyoxethylene sorbitan monolaurate — HLB 16.7); Arlacel 20 (sorbitan monostearate — HLB 8.6) Myrj 45 (polyoxyethylene stearate — HLB 11.1); Arlacel 40 (sorbitan monopalmitate — HLB 6.7); Myrj 53 (polyoxyethylene stearate — HLB 17.9); Span 85 (sorbitan trioleate — HLB 1.8); Myrj 52 (polyoxethylene stearate — HLB 16.9); Span 20 (sorbitan monolaurate — HLB 8.6); G-1790 (polyoxyethylene lanolin derivatives — HLB 11); G 1471 (polyoxyethylene sorbitol lanolin derivatives — HLB 16); G-1441 (polyoxyethylene sorbitol lanolin derivatives — HLB 14); Span 80 (sorbitan monoleate — HLB 4.3); G-1471 (polyoxyethylene sorbitol lanolin derivatives — HLB 16); G-1702 (polyoxyethylene sorbitol beeswax derivatives — HLB 5); Tween 81 (polyoxyethylene sorbitan monooleate — HLB 10); G-1726 (polyoxyethylene sorbitol beeswax derivatives — HLB 5); Brij 30 (polyoxyethylene lauryl ethers — HLB — 9.5); Brij 35 (polyoxyethylene lauryl ethers — HLB 16.9); and for water in oil emulsions, Span 80; Arlacel 85 (sorbitan sesquioleate — HLB 3.7); Tween 61 (polyoxyethylene sorbitan monostearate — HLB 9.6); Arlacel 83 (sorbitan sesquioleate — HLB 3.7); and Span 85. Union Carbide and Carbon Corporation, New York, New York, nontoxic, nonionic Carbowax and Pluronics surfactants can likewise be used, with particularly good results being obtained from Carbowax 1540 (polyethylene glycols — HLB approx 7) where it is desired to employ either an oil in water or a water in oil emulsion carrier, and Pluronics 62 (addition products of ethylene oxide to polypropylene glycols — HLB approx. 7); in the case of oil in water emulsions. An especially useful amphoteric surfactant for an oil in water emulsion carrier has been found to be Miranol DS (an emphotylic fatty acid derived combination of monocarboxylates, dicarboxylates and sulfonates - HLB approx. 7). The general formula of Miranol DS may be represented as:

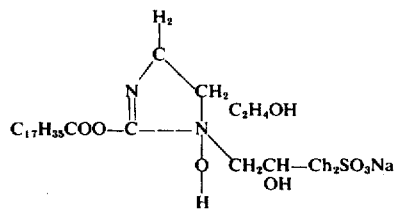

Nontoxic, nonionic or amphoteric surfactants such as those listed above when used in oil in water, or water in oil emulsion carriers as chosen should be used in amounts which assure emulsion stability (a minimum of three weeks), desirable pharmaceutical elegance, nontoxic (no descernible adverse reactions) and adjuvancy. It has been found that with the surfactants mentioned, these properties are obtained when the final HLB of the emulsifier system is within the noted range of about 3 to about 16, and at a level of use from about 1 to 20% by volume.

Although cottonseed oil is the preferred oil for preparing the carrier, other nontoxic oils are also usable such as olive oil and peanut oil.

Many types of medicinal agents may be incorporated with the adjuvant of this invention. In the antigen category, exemplary active immunogenic agents include *Clostridium Chauvoei; Clostridium septicum; Erysipelothrix insidious; Leptospiria anterogens; Streptoccus equi; Clostridium sordellia; Clostridium novyi;* and *Clostridium hemolyticum*. Toxoid antigens which can be combined with the adjuvant include *Clostridium perfringens* (Types C and D); and *Clostridium tetani*. Viral type antigens include *Encephalomyelitis* (WEE and EEE); Foot Mouth Disease Virus FMVD); *Encephalomyelitis* (WEE), *Encephalomyelitis* (EEE) *and Clostridium tetani* in combination; *Bovine virus diahrrea* (BVD); Infectious *bovine rhinotracheaitis* (IBR); Parainfluenza ($PI_3$); and measles virus. Usable serums include tetanus antiserum, and *Clostridium perfringens* (Types B, C and D) in serum form. Adrenalin is one of a number of hormones which may be combined with the adjuvant system previously described.

The preferred ranges of the constituents of the adjuvant are as follows:

EXAMPLE I

1–10 ml. emulsion system (oil-water-surfactants)
0.1 gm. Carbopol 934P
100 ml. q.s. distilled water Best results have been obtained using the following proportions of constituents in the adjuvant:

EXAMPLE II 1 ml. emulsion system (oil-water-surfactants)
0.2 gm. Carbopol 934P
100 ml. q.s. distilled water One particularly useful adjuvant and which is claimed in application Ser. No. 707,671 referred to above contains:

EXAMPLE III

Adjuvant "HL"

2.5 ml. polyoxyethylene sorbitan monooleate (Tween 80, Atlas Powder Co.)
2.5 ml. sorbitan monolaurate (Span 20, Atlas Powder Co.) 0.2 gm. Carbopol 934P
50 ml. cottonseed oil
100 ml. q.s. distilled water (HLB Approximately 12)

Variation of the proportions of the emulsion system is permissible over specific ranges, as alluded to above. However, in the emulsifier system of Example III the HLB factor preferably should be maintained within the range of about 11.2 to approximately 12. This is the formulation used in Examples IX, X, XI, XII, XIII set forth hereinafter.

The amount of adjuvant combined with the medicinal agent should be varied depending upon the characteristics of the particular product and whether or not a suspension is desired. Generally, the final injectable composition will contain from 10 percent to 90 percent by weight of an adjuvant preparation of the preferred relative proportions. Sufficient adjuvant should be added to cause a substantially homogenous suspension to be formed which is not so viscous that it will not readily flow through standard size hollow needles (14 to 26 guage).

Carbopol 934P is thought to have the property of forming chemical and/or physical bonds with protein and mucopolysaccharide antigens, as well as other compositions containing N atoms, holding them in a moderately viscous menstruum which slowly releases certain bound components under in vivo physiological conditions. It is theorized that because of the high van der Waal cohesive forces and hydrogen bonding tendencies exhibited by Carbopol 934P toward most proteins, it forms loose hydrogen bonds as well as carobxyl bonds with compounds containing N atoms available for bond sites. Thus, for example, in the case of immunogenic compositions, the Carbopol 934P provides a more stable antigenic complex which serves to decrease the rate of metabolic degradation of the antigenic complex by enzymes (lyotropic and proteolytic enzymes) by the leucocytes at the site of inoculation (e.g., polymorphonuclear neutrophils). Immunological competent cells are then attracted to the site of the injection or mobile depots so that they can form antibodies in response to the antigenic stimulation.

It is believed that the Carbopol 934P antigenic complex is more accessible to lymphocytes and is more resistant to enzymation degration by neutrophils. One of the biggest problems in immunology and essentially one of the basic functions of an adjuvant is to protect the antigen composition from rapid neutrophil deterioration. The large molecules formed by the resin-antigen combination thus serve to protect the antigenic material from rapid enzymatic deterioration.

Normally, only small amounts of Carbopol 934P in powder form may be brought into aqueous suspension at pH's on the alkaline side of neutrality. The viscosity increases manyfold when a pH of 8 is reached; but by using an emulsifier in the system it is possible to increase the concentration and aqueous stability of the adjuvant containing Carbopol 934P without causing gelation at pH levels of 7 to 8. An increase in the pH of Carbopol 934P in aqueous suspension to pH's in the range of 7 to 8 not only causes the viscosity to increase but also probably results in the resin forming loose bonds with water. This holds the Carbopol 934P suspension and increases the electrostatic tension of the colloidal suspension to the point where its viscosity substantially increases. Additions of proteins or organic molecules to Carbopol 934P during this time causes the viscosity to drop. It is likely that organic molecules such as proteins and amines have a higher binding coefficient to the free bonding sites of the resin than does water. Water is, therefore, pushed out and the viscosity of the total menstruum is lowered.

Use of an emulsifier such as the emulsion systems described makes it possible to dissolve more Carbopol 934P in aqueous solution without gelation than is the case when such emulsifier is omitted. This apparently causes a lower water binding tendency and it is possible therefore to increase the protein or amine load substantially above that of solutions just containing Carbopol 934P alone. Carbopol 934P has some emulsion stabilizing properties. Thus, the hydrophile-lipophile balance does not appear to be as critical when Carbopol 934P is used.

An amine dye such as phenylenediamine may be used to trace the dispersion route of an adjuvant as disclosed herein, through the system of a host. In one such test, a small quantity of this dye (1 mg./1,000 ml.) was added to an adjuvant composition such as Example II. The dye, because of its amine sites, bonded tightly to the Carbopol 934P resin, allowing the total adjuvant menstruum to be traced after injection into the body. All injections were made subcutaneously and 10 animals (mice) were used in the experiment. The phenylenediamine was slowly removed from the subcutaneous injection site in each animal as the days passed. By the seventh day following inoculation, less than one-third of the material could be found at the site of injection. The kidneys, liver and spleen of one of the test animals were removed and no dye was detected in these organs. By the fourteenth day, no dye that could be visually observed was present in any of the animals. This experiment shows that an amine dye having approximately the same bond potential for Carbopol 934P as proteinaceous antigens, is held by the synthetic resin and slowly released from the Carbopol 934P bond. The mechanism of this release is not fully understood but probably is attributable not only to a raise in pH (alkalinity of the tissues) and uncoupling by enzyme action, but also degradation by the tissues of the body to cause the bound dye to be slowly given up to the animal's system.

It has previously been suggested that Carbopol 934P has some stabilizing effect on proteins and it has now been found that it also stabilizes antigens. For example, it has been established that there was no loss in antigenic potency of a vaccine having a quantity of adjuvant of Example III therein when the product was stored at 37° C. for 1 month. This result is to be contrasted with the fact that antigens without protection deteriorate logarithmically under high temperature conditions. The ability of Carbopol 934P to stabilize antigens is believed to occur in at least the following ways: (1) protection against kinetic energy (heat); (2) protection from free radicals; (3) protection from deterioration caused by water of crystallization of freezing and (4) Carbopol 934P is believed to preclude or mininmize antigenic deterioration due to oxidation and reduction.

Carbopol 934P has the property of protecting aqueous solutions from free radical deterioration because of the way in which most free radicals are picked up by the resin itself thereby preserving and protecting other labile substances present in the menstruum. In most aqueous and saline solutions, normal room conditions cause micro-molecular collisions of molecules which produce aging because of kinetic deterioration. When Carbopol 934P is added to a composition not only does the kinetic energy decrease in the system, but the substances which become bound to the resin are thereby protected by the large molecule attached thereto. In the case of antigens and other substances, the fact that Carbopol 934P assists in the formation of a stable emulsion also serves to insure that the injectable produce remains in a truly homogeneous state and thus approximately equal amounts of the actual materials are distributed throughout each milliliter of the aqueous suspension. Insofar as protection against freezing is concerned, it has been determined that vaccines containing the adjuvant of Example III do not freeze at temperatures as low as −30° C. It is generally thought that Carbopol 934P will freeze at about −10° F. but even so it does not actually freeze because in this particular case water is bound to the molecules of the resin. It is known that bound water has difficulty in forming crystals and that actual crystal formation is necessary prior to what is designated mechanical freezing. In the present system most of the water is tied up with the resin, and mechanical freezing, which is the major deteriorative force on antigens at low temperature, is minimized. Carbopol934P also serves to stabilize the emulsion state of the adjuvant, and helps suspend any unbound antigen in the menstruum when used in the proper amounts, thus making a homogeneous preparation. In addition, Carbopol 934P has the property of holding the antigen in the tissues longer than would normally be the case, thus creating a depot effect. This in itself provides an adjuvant effect attributable to a potentiated reaction similar to that induced by small repeated doses of vaccine administered over a span of time.

Since Carbopol 934P also increases the viscosity of the injected vaccine, this in itself serves to slow the absorption rate of the antigen from the injection site, thereby producing an adjuvant effect by virtue of the fact that access of body fluids to the bound and unbound antigens contained within the innoculant is restricted. As an injection menstruum, Carbopol 934P provides high viscosity and adhesive characteristics with less irritation, providing it is properly loaded with antigens or other amine compounds than is the case with common parenterally injectable compositions, such as normal saline and distilled water.

The combination of an emulsifier with Carbopol 934P makes it possible to dissolve larger amounts of resin in the menstruum than would otherwise be the case, thereby making the total process of producing the adjuvant easier and faster. The increased amount of resin made soluble by use of the emulsifier makes it possible to load more antigen into the preparation and also to increase the viscosity to levels that allow more thorough suspension of any surplus (unbound) antigen, as well as the necessary electrostatic tension to provide a good holding agent in the tissues. The emulsifier of Example III has a sensitive hydrophile-lipophile balance (HLB) of 12. This balance provides the necessary emulsion stability with a high level of homogeneity for large polymer molecules such as Carbopol 934P.

Incorporation of an emulsifier as set forth in Example I into the composition makes an emulsion of the adjuvant vaccine, and because of this emulsified state it appears to be routed to the lymphatic system where it may contact the lymphoid series cells (in lymph glands), which can absorb the antigen by pinocytosis. Since the locus of the immune reaction resides chiefly in the cells of the lymphocyte series, such a routing is highly desirable. Other adjuvants reside at the site of injection until phagocytized by neutrophils. These neutrophils destroy part of the antigen by enzymic degradation, and the rest finally finds its way to the lymphatic system. The present system results in a more efficient utilization of the antigen. The emulsifier combination disclosed herein consist of a nonionic or amphoteric emulsifiers. Because of this, as well as because of the small quantity of these nonionic or amphoteric surfactants utilized in the total menstruum, there is very little, if any, tissue damage due to ion imbalance in the tissue. Also, very little oil is required in the adjuvant and this also minimizes any sterile abcesses that might be produced. In addition, the recommended oils are relatively readily metabolized by the host. Thus, Carbopol 934P and the N atom containing compound (e.g., antigen, gelatin, collagen and/or other N containing compound) which forms a depot effect, represent one phase of the adjuvant. Another phase if represented by the emulsified nature of the adjuvant which routes the antigen, when released, to the lymphatic immune system. The result is a two-phased adjuvant: (1) depot; and (2) dispersion to the lymphatic system. Also as previously indicated, the addition of an emulsifier to Carbopol 934P makes possible the raising of the total menstruum to pH 7.0 or above without gelation which facilitates injection.

Since remaining unreacted free hydroxyl or carboxyl groups of the Carbopol 934P molecules may bind to the host's tissues at the injection site and could cause irritation or induration, it is sometimes desirable to minimize this possibility, particularly when the antigen or other medicinal agent does not possess sufficient N atoms to tie up enough of the free sites of the Carbopol to avoid an irritating effect therefrom. These carboxyl-hydroxyl groups can be neutralized by chemical bonding with amine groups of various chemical compounds such as: (1) protein antigens; (2) collagen (preferably reconstituted); (3) gelatin; (4) basic amino acids, (5) epinephrine or other catecholamines; (6) peptides; (7) synthetic amines or polyamines; or (8) peptide (amino-group-containing) antibiotics such as penicillin, neomycin sulfate, polymixin B sulfate and streptomycin.

When the bond sites of Carbopol 934P are not fully occupied by antigens, then in order to protect the host's tissues from irritation, sufficient amine-containing substances as noted above may be added to neutralize most of the free hydroxyl or carboxyl groups. The selected compound or material depends upon the nature of the final product. For example, reconstituted collagen is ideally suited in many cases where the injection is to be made subcutaneously since it is a natural relatively nonantigenic substance at this subcutaneous site and therefore tends to bond to the natural collagen, thus adding to the adjuvant effect by mechanically interfering with the dispersion of the antigen. Purified or reconstitued collagen is an essentially nonallergenic protein since it does not contain sugnificant amounts of tryptophane nor tyrosine; hence, it does not cause significant tissue reactions. Furthermore, reconstituted collagen does not stimulate a significant secondary antigenic response which would compete with that of the antigen.

A preferred procedure for producing reconstituted collagen for use in the adjuvant is detailed in the process flow sheet set forth in co-owned U.S. Pat. No. 3,639,577, issued Feb. 1, 1972. Other procedures are outlined in U.S. Pat. No. Re. 26,963.

Examples IV and V hereunder set forth operable surfactant combinations for use in the present adjuvant within the range specified in Example I and giving outstanding emulsion stability, pharmaceutical elegance and adjuvancy without deleterious toxicity. In Example IV representative surfactant combinations are set forth for oil in water emulsions.

EXAMPLE IV.

| | Undiluted HLB | percentage | Initial HLB | Final HLB |
|---|---|---|---|---|
| 1. Tween 80 | 15.0 | 3% | 4.5 | |
| Arlacel 80 | 4.3 | 7% | 3.0 | 7.5 |
| 2. Tween 80 | 15.0 | 4% | 6.0 | |
| Arlacel 80 | 4.3 | 6% | 2.6 | 8.6 |
| 3. Tween 80 | 15.0 | 5% | 7.5 | |
| Arlacel 80 | 4.3 | 5% | 2.2 | 9.7 |
| 4. Tween 80 | 15.0 | 6% | 9.0 | |
| Arlacel 80 | 4.3 | 4% | 1.7 | 10.7 |
| 5. Tween 80 | 15.0 | 7% | 10.5 | |
| Arlacel 80 | 4.3 | 3% | 1.3 | 11.8 |
| 6. Tween 80 | 15.0 | 8% | 12.0 | |
| Arlacel 80 | 4.3 | 2% | .9 | 12.9 |
| 7. Tween 20 | 16.7 | 5% | 8.3 | |
| Arlacel 20 | 8.6 | 5% | 4.3 | 12.6 |
| 8. Tween 20 | 16.7 | 6% | 10.0 | |
| Arlacel 20 | 8.6 | 4% | 3.4 | 13.4 |
| 9. Tween 20 | 16.7 | 7% | 11.6 | |
| Arlacel 20 | 8.6 | 3% | 2.5 | 14.1 |
| 10. Tween 20 | 16.7 | 8% | 13.4 | |
| Arlacel 20 | 8.6 | 2% | 1.7 | 15.1 |
| 11. Myrj 45 | 11.1 | 3% | 3.3 | |
| Arlacel 40 | 6.7 | 7% | 4.6 | 7.9 |
| 12. Myrj 45 | 11.1 | 4% | 4.4 | |
| Arlacel 40 | 6.7 | 6% | 4.0 | 8.4 |
| 13. Myrj 45 | 11.1 | 5% | 5.5 | |
| Arlacel 40 | 6.7 | 5% | 3.4 | 8.9 |
| 14. Myrj 45 | 11.1 | 6% | 6.7 | |
| Arlacel 40 | 6.7 | 4% | 2.7 | 9.4 |
| 15. Myrj 45 | 11.1 | 7% | 7.7 | |
| Arlacel 40 | 6.7 | 3% | 2.0 | 9.7 |
| 16. Myrj 45 | 11.1 | 8% | 8.8 | |
| Arlacel 40 | 6.7 | 2% | 1.3 | 10.1 |
| 17. Myrj 53 | 17.9 | 3% | 5.4 | |
| Arlacel 20 | 8.6 | 7% | 6.2 | 11.6 |
| 18. Myrj 53 | 17.9 | 4% | 7.2 | |
| Arlacel 20 | 8.6 | 6% | 5.2 | 12.4 |
| 19. Myrj 53 | 17.9 | 5% | 9.0 | |
| Arlacel 20 | 8.6 | 5% | 4.3 | 13.3 |
| 20. Myrj 53 | 17.9 | 6% | 10.7 | |
| Arlacel 20 | 8.6 | 4% | 3.4 | 14.1 |
| 21. Myrj 53 | 17.9 | 7% | 12.4 | |
| Arlacel 20 | 8.6 | 3% | 2.6 | 15.0 |
| 22. Myrj 53 | 17.9 | 8% | 15.0 | |
| Arlacel 20 | 8.6 | 2% | 1.7 | 16.7 |
| 23. Myrj 45 | 11.1 | 6% | 6.6 | |
| Span 85 | 1.8 | 4% | 7 | 7.3 |
| 24. Myrj 45 | 11.1 | 7% | 7.7 | |
| Span 85 | 1.8 | 3% | .5 | 8.3 |
| 25. Myrj 45 | 11.1 | 8% | 8.8 | |
| San 85 | 1.8 | 2% | .4 | 9.2 |
| 26. Myrj 45 | 11.1 | 9% | 9.9 | |
| Span 85 | 1.8 | 1% | .2 | 10.1 |
| 27. Myrj 52 | 16.9 | 3% | 5.1 | |
| Span 20 | 8.6 | 7% | 6.7 | 11.8 |
| 28. Myrj 52 | 16.9 | 4% | 6.8 | |
| Span 20 | 8.6 | 6% | 5.2 | 12.0 |
| 29. Myrj 52 | 16.9 | 5% | 8.5 | |
| Span 20 | 8.6 | 5% | 4.3 | 12.8 |
| 30. Myrj 52 | 16.9 | 6% | 10.1 | |
| Span 20 | 8.6 | 4% | 3.4 | 13.5 |
| 31. Myrj 52 | 16.9 | 7% | 11.9 | |
| Span 20 | 8.6 | 3% | 2.6 | 14.5 |
| 32. Myrj 52 | 16.9 | 8% | 13.6 | |
| Span 20 | 8.6 | 2% | 1.7 | 15.3 |
| 33. G-1790 | 11.0 | 4% | 4.4 | |
| Arlacel 80 | 4.3 | 6% | 2.6 | 7.0 |
| 34. G-1790 | 11.0 | 5% | 5.5 | |
| Arlacel 80 | 4.3 | 5% | 2.2 | 7.7 |
| 35. G-1790 | 11.0 | 6% | 6.6 | |
| Arlacel 80 | 4.3 | 4% | 1.7 | 8.3 |
| 36. G-1790 | 11.0 | 7% | 7.7 | |
| Arlacel 80 | 4.3 | 3% | 1.3 | 9.0 |
| 37. G-1790 | 11.0 | 8% | 8.8 | |
| Arlacel 80 | 4.3 | 2% | .8 | 9.6 |
| 38. G-1790 | 11.0 | 9% | 9.9 | |
| Arlacel 80 | 4.3 | 1% | .4 | 10.3 |
| 39. G-1471 | 16.0 | 5% | 8.0 | |
| Arlacel 40 | 6.7 | 5% | 3.4 | 11.4 |
| 40. G-1471 | 16.0 | 6% | 9.6 | |
| Arlacel 40 | 6.7 | 4% | 2.7 | 12.3 |
| 41. G-1471 | 16.0 | 7% | 11.3 | |
| Arlacel 40 | 6.7 | 3% | 2.0 | 13.3 |
| 42. G-1471 | 16.0 | 8% | 12.8 | |
| Arlacel 40 | 6.7 | 2% | 1.3 | 14.1 |
| 43. G-1471 | 16.0 | 9% | 14.4 | |
| Arlacel 40 | 6.7 | 1% | 7 | 15.1 |
| 44. G-1441 | 14.0 | 3% | 4.2 | |

EXAMPLE IV.-continued

| | Undiluted HLB | percentage | Initial HLB | Final HLB |
|---|---|---|---|---|
| | Span 80 | 4.3 | 7% | 3.0 | |
| 45. | G-1441 | 14.0 | 4% | 5.6 | 7.2 |
| | Span 80 | 4.3 | 6% | 2.6 | 8.2 |
| 46. | G-1441 | 14.0 | 5% | 7.0 | |
| | Span 80 | 4.3 | 5% | 2.1 | 9.1 |
| 47. | G-1441 | 14.0 | 6% | 8.4 | |
| | Span 80 | 4.3 | 4% | 1.7 | 10.1 |
| 48. | G-1471 | 16.0 | 3% | 4.8 | |
| | Span 20 | 8.6 | 7% | 6.0 | 10.8 |
| 49. | G-1471 | 16.0 | 4% | 6.4 | |
| | Span 20 | 8.6 | 6% | 5.2 | 11.6 |
| 50. | G-1471 | 16.0 | 5% | 8.0 | |
| | Span 20 | 8.6 | 5% | 4.3 | 12.3 |
| 51. | G-1471 | 16.0 | 6% | 9.6 | |
| | Span 20 | 8.6 | 4% | 3.4 | 13.0 |
| 52. | G-1471 | 16.0 | 7% | 11.3 | |
| | Span 20 | 8.6 | 3% | 2.6 | 13.9 |
| 53. | G-1471 | 16.0 | 8% | 12.8 | |
| | Span 20 | 8.6 | 2% | 1.7 | 14.5 |
| 54. | Tween 81 | 10.0 | 5% | 5.0 | |
| | G-1702 | 5.0 | 5% | 2.5 | 7.5 |
| 55. | Tween 81 | 10.0 | 6% | 6.0 | |
| | G-1702 | 5.0 | 4% | 2.0 | 8.0 |
| 56. | Tween 81 | 10.0 | 7% | 7.0 | |
| | G-1702 | 5.0 | 3% | 1.5 | 8.5 |
| 57. | Tween 81 | 10.0 | 8% | 8.0 | |
| | G-1702 | 5.0 | 2% | 1.0 | 9.0 |
| 58. | Tween 20 | 16.7 | 4% | 6.7 | |
| | G-1726 | 5.0 | 6% | 3.0 | 9.7 |
| 59. | Tween 20 | 16.7 | 5% | 8.4 | |
| | G-1726 | 5.0 | 5% | 2.5 | 10.9 |
| 60. | Tween 20 | 16.7 | 6% | 10.0 | |
| | G-1726 | 5.0 | 4% | 2.0 | 12.0 |
| 61. | Tween 20 | 16.7 | 7% | 11.8 | |
| | G-1726 | 5.0 | 3% | 1.5 | 13.3 |
| 62. | Tween 20 | 16.7 | 8% | 13.4 | |
| | G-1726 | 5.0 | 2% | 1.0 | 14.4 |
| 63. | Brij 35 | 16.9 | 3% | 5.0 | |
| | Brij 30 | 9.5 | 7% | 6.6 | 11.6 |
| 64. | Brij 35 | 16.9 | 4% | 6.6 | |
| | Brij 30 | 9.5 | 6% | 5.6 | 12.2 |
| 65. | Brij 35 | 16.9 | 5% | 8.4 | |
| | Brij 30 | 9.5 | 5% | 4.8 | 13.2 |
| 66. | Brij 35 | 16.9 | 6% | 10.1 | |
| | Brij 30 | 9.5 | 4% | 3.8 | 13.9 |
| 67. | Brij 35 | 16.9 | 7% | 11.8 | |
| | Brij 30 | 9.5 | 3% | 2.6 | 14.4 |
| 68. | Brij 35 | 16.9 | 8% | 13.6 | |
| | Brij 30 | 9.5 | 2% | 1.9 | 15.5 |

Exemplary of suitable surfactants and combinations thereof useful for water in oil emulsions are the following:

EXAMPLE V.

| | Undiluted HLB | percentage | Initial HLB | Final HLB |
|---|---|---|---|---|
| 1. | Span 80 | 4.3 | 5% | 2.2 | |
| | Arlacel 85 | 1.8 | 5% | .9 | 3.1 |
| 2. | Span 80 | 4.3 | 6% | 2.6 | |
| | Arlacel 85 | 1.8 | 4% | .7 | 3.3 |
| 3. | Span 80 | 4.3 | 7% | 2.9 | |
| | Arlacel 85 | 1.8 | 3% | .5 | 3.4 |
| 4. | Span 80 | 4.3 | 8% | 3.4 | |
| | Arlacel 85 | 1.8 | 2% | .4 | 3.8 |
| 5. | Span 20 | 8.6 | 2% | 1.7 | |
| | Arlacel 83 | 3.7 | 8% | 2.0 | 4.7 |
| 6. | Span 20 | 8.6 | 3% | 2.5 | |
| | Arlacel 83 | 3.7 | 7% | 2.6 | 5.1 |
| 7. | Span 20 | 8.6 | 4% | 3.4 | |
| | Arlacel 83 | 3.7 | 6% | 2.2 | 5.6 |
| 8. | Span 20 | 8.6 | 5% | 4.3 | |
| | Arlacel 83 | 3.7 | 5% | 1.8 | 6.1 |
| 9. | Tween 61 | 9.6 | 2% | 1.9 | |
| | Arlacel 85 | 1.8 | 8% | 1.4 | 3.3 |
| 10. | Tween 61 | 9.6 | 3% | 3.2 | |
| | Arlacel 85 | 1.8 | 7% | 1.0 | 4.2 |
| 11. | Tween 61 | 9.6 | 4% | 3.8 | |
| | Arlacel 85 | 1.8 | 6% | 1.0 | 4.8 |
| 12. | Tween 61 | 9.6 | 5% | 4.8 | |
| | Arlacel 85 | 1.8 | 5% | .9 | 5.7 |
| 13. | Tween 61 | 9.6 | 6% | 5.7 | |
| | Arlacel 85 | 1.8 | 4% | .7 | 6.4 |
| 14. | Tween 61 | 9.6 | 1% | 1.0 | |
| | Arlacel 83 | 3.7 | 2% | .7 | |

EXAMPLE V.-continued

| | Undiluted HLB | percentage | Initial HLB | Final HLB |
|---|---|---|---|---|
| | Span 85 | 1.8 | 7% | 1.3 | 3.0 |
| 15. | Tween 61 | 9.6 | 2% | 1.9 | |
| | Arlacel 83 | 3.7 | 3% | 1.1 | |
| | Span 85 | 1.8 | 5% | .9 | 3.9 |
| 16. | Tween 61 | 9.6 | 4% | 3.8 | |
| | Arlacel 83 | 3.7 | 2% | .7 | |
| | Span 85 | 1.8 | 4% | .7 | 4.2 |
| 17. | Tween 61 | 9.6 | 4% | 3.8 | |
| | Arlacel 83 | 3.7 | 3% | 1.1 | |
| | Span 85 | 1.8 | 3% | .5 | 5.4 |
| 18. | Tween 61 | 9.6 | 5% | 4.8 | |
| | Arlacel 83 | 3.7 | 2% | .7 | |
| | Span 85 | 1.8 | 3% | .5 | 6.0 |
| 19. | Tween 61 | 9.6 | 2.5% | 2.4 | |
| | Arlacel 85 | 1.8 | 3.5% | .6 | |
| | Span 85 | 1.8 | 4.0% | .7 | 3.7 |
| 20. | Tween 61 | 9.6 | 3.0% | 3.2 | |
| | Arlacel 85 | 1.8 | 4.0% | .7 | |
| | Span 85 | 1.8 | 3.0% | .5 | 4.4 |
| 21. | Tween 61 | 9.6 | 4% | 3.8 | |
| | Arlacel 85 | 1.8 | 3% | .5 | |
| | Span 85 | 1.8 | 3% | .5 | 4.8 |
| 22. | Tween 61 | 9.6 | 4% | 3.8 | |
| | Arlacel 85 | 3.7 | 4% | 1.5 | |
| | Span 85 | 1.8 | 2% | .4 | 5.7 |

Although the above examples disclose preferred combinations of surfactants to obtain preferred HLB numbers, it is to be recognized that at least certain of the surfactants as well as nonionic equivalents thereof may be used singly so long as they have a useful HLB factor and the Pluronics and Carbowax surfactants previously mentioned are examples along with the amphoteric sulfonated surface active agent, Mironal DS.

In another series of tests, the relative proportions of oil, water and surfactant in the emulsion systems hereof were varied in order to determine the range of use of such components. In each case cottonseed oil, water, and equal amounts of Span 20 and Tween 80 were employed. All of the emulsions produced in accordance with the following schedule were found to be nontoxic and fully operable in the adjuvants hereof.

EXAMPLE VI.

| | % Vol. Oil | % Vol. $H_2O$ | % Vol. Span 20 | % Vol. Tween 80 |
|---|---|---|---|---|
| 1. | 35 | 64 | 0.5 | 0.5 |
| 2. | 45 | 54 | 0.5 | 0.5 |
| 3. | 44 | 44 | 0.5 | 0.5 |
| 4. | 65 | 34 | 0.5 | 0.5 |
| 5. | 75 | 24 | 0.5 | 0.5 |
| 6. | 85 | 14 | 0.5 | 0.5 |
| 7. | 25 | 70 | 2.5 | 2.5 |
| 8. | 35 | 60 | 2.5 | 2.5 |
| 9. | 45 | 50 | 2.5 | 2.5 |
| 10. | 55 | 40 | 2.5 | 2.5 |
| 11. | 65 | 30 | 2.5 | 2.5 |
| 12. | 75 | 20 | 2.5 | 2.5 |
| 13. | 40 | 45 | 7.5 | 7.5 |
| 14. | 45 | 40 | 7.5 | 7.5 |
| 15. | 50 | 35 | 7.5 | 7.5 |
| 16. | 55 | 30 | 7.5 | 7.5 |
| 17. | 40 | 40 | 10 | 10 |
| 18. | 50 | 30 | 10 | 10 |

It will be seen from the foregoing results that the amount of surfactant can be varied from about 1 to 20 percent by volume of the total emulsion system, and that correspondingly the remaining oil and water components thereof can also be varied within wide limits.

A number of representative surfactant systems of Examples IV and V were subjected to in vitro titration and hemagglutination inhibition tests in accordance with the following protocol.

EXAMPLE VII

I. CONDUCT OF IN VIVO TITRATION EXPERIMENT

A. Methods and Materials

1. Antigen

Western Equine Encephalomyelitis virus was propagated, inactivated and prepared according to standard conventional procedures.

2. Emulsifiers

Both oil in water and water in oil emulsifiers were prepared using surfactants of the non-ionic and amphoteric types as specifically identified in the table of this example.

3. Adjuvants

Adjuvants were prepared using various emulsifiers and Carbopol 934P with concentrations of 10.0 percent on a volume basis and 2.0 gm % basis respectively.

4. Vaccine-Adjuvant Preparation

Inactivated Western Equine Encephalomyelitis virus antigen with a titer of $10^{7.5}$ per ml. was added to each adjuvant perparation in ratios of 90:10, 75:25, 50:50 V/V.

5. Vaccination Schedule

11–13 gram female mice were used for vaccination and each set of preparations were studied singularly. Thirty mice per dilution (90 mice total) were vaccinated on Day 1 using 0.25 ml. dose administered subcutaneously in the rear flank. These animals were boostered in a similar manner on Day 28. On Day 35 these mice and a set of non-vaccinated controls were challanged as follows:

| Challenge Dilution | Vaccinates | Controls |
|---|---|---|
| 10–4.5 | 5 mice | 5 mice |
| 10–5.0 | 5 mice | 5 mice |
| 10–5.5 | 5 mice | 5 mice |
| 10–6.0 | 5 mice | 5 mice |
| 10–6.5 | 5 mice | 5 mice |

One week later these animals were observed and deaths recorded.

6. Challenge

Live WEE virus CWEE-BG 3/3/71, was prepared and stored at −80° C. in 5 ml. aliquots. One vial of this material was unfrozen for each set of mice to be challenged. Half log dilutions from 10–4.5 to 10–6.5 were made in sterile PBS.

Before challenge, mice were anesthetized with ether. Challenge consisted of 0.03 ml. administered intracerebrally.

7. Results

The table hereunder summarizes the results of this study. The neutralization index (NI) is the difference between control $LD_{50}$ and vaccinate $LD_{50}$ (at similar dilutions) expressed as an exponent of 10. This was done in order to compensate for differences in challenge virus from one vial to another.

The following conclusions can be drawn from the table below. First, the adjuvant preparation of oil in water and water in oil using nonionic and amphoteric surfactants are compatible with Carbopol 943P. Second, a decrease in antigenic material coupled with an increase in adjuvant concentration resulted in an increase in the immunogenic response in general as shown by the percent survivors and neutralization index (NI).

II. HEMAGGLUTINATION INHIBITION TEST

A. Methods and Materials

1. Vaccine

The vaccine preparations with adjuvants used in this experiment were the same as those used in the previous test.

2. Animals

11–13 gram female mice were used for vaccination. Control mice weighed 18–20 grams.

3. Schedule 5 mice per dilution were vaccinated on day 1 using .25 ml. dose administered subcutaneously in the rear flank. These animals were boostered on Day 28 in the same fashion. On Day 35 these mice were bled from the heart. Equal amounts of serum from each of the mice in the set was pooled for the hemagglutination inhibition test; these samples were stored at 4° C. until the day of the test.

4. Test a. Acetone Extraction of Serum Samples

To .2 ml. samples of the above pooled sera was added 0.8 ml. isotonic saline and 2.4 ml. acetone. After mixing, the samples were centrifuged at 1500 rpm for 6 minutes at 4° C. The supernate was discarded, .2 ml. acetone was added to the samples, mixed and incubated at room temperature for 1 hour. After incubation, the samples were again centrifuged and the supernate was discarded. The samples were then dried in a −30 psi vaccume for 1 hour. 1.25 ml. bovine albumin borate saline (BABS) and .6 ml. of 8 percent goose cells were then added and mixed intermittently for 1 hour, for removing non-specific agglutinin. Absorption continued overnight at 4° C. The following day, samples were centrifuged and the supernate was heat inactivated at 56° for 30 minutes. This was stored at 4° as 1:10 acetone treated serum.

b. Diluent

The standard diluent used was 0.4 percent bovine albumin borate saline (BABS).

c. Antigen

A lyophilized Western Equine Encephalomyelitis virus, originally from new-born mouse brain, was reconstituted with BABS. From previous tests, it has been determined that the antigen was to be used at a 1:80 dilution.

d. Microtiter HAI

Standard microtiter method was employed using the previously mentioned sera, antigen, diluent (BABS), and goose cells. The goose cells were further diluted in pH 6.4 veranol acid dextrose (VAD), 1 part 8% goose cells and 23 parts VAD. Final dilutions were: 1:10, 1:20, 1:40, 1:80, 1:160, 1:320, 1:640, and serum control.

5. Results

The tabular comparison hereunder of the challenge experiment with the HAI titration shows that NI and HAI results are comparable. The vaccine without adjuvant afforded little protection in vivo and gave a negative HAI. The adjuvant-vaccine preparations elicited, various amounts of increased antibody titer as indicated in the table.

TABLE OF EXAMPLE VII.

| Adjuvant Preparation Antigen Encyphalomeylitis (WEE) | | Antigen to Adjuvant V/V | Carbopol 934 Grams % | Surfactant Grams % | Chall. Dose (Mouse) LD$_{50}$ | Survivors Principals | Survivors | NI | HAI Titer |
|---|---|---|---|---|---|---|---|---|---|
| Tween 20 7% | | 90/10 | 0.2 | 0.10 | 5.84 | 20/25 | 80% | 12.6 | 10 |
| Arlacel 20 3% | | 75/25 | 0.5 | 0.25 | 5.84 | 23/25 | 92% | 21.9 | 80 |
| Cottonseed Oil 50% | Vol. | 50/50 | 1.0 | 0.50 | 5.84 | 23/25 | 92% | 21.9 | 80 |
| Water 40% | | | | | | | | | |
| HLB 14.1 | | | | | | | | | |
| Carbopol 934P | | | | | | | | | |
| Myrj 53 3% | | 90/10 | 0.2 | 0.10 | 6.08 | 21/25 | 84% | 26.4 | 80 |
| Arlacel 20 7% | | 75/25 | 0.5 | 0.25 | 6.08 | 22/25 | 88% | 31.6 | 160 |
| | Vol. | 50/50 | 1.0 | 0.50 | 6.08 | 19/25 | 76% | 18.6 | 80 |
| Oil 50% | | | | | | | | | |
| Water 40% | | | | | | | | | |
| HLB 11.6 | | | | | | | | | |
| Carbopol 934P | | | | | | | | | |
| Myrj 45 8% | | 90/10 | 0.2 | 0.10 | 6.42 | 18/25 | 72% | 26.3 | 40 |
| Span 85 2% | | 75/25 | 0.5 | 0.25 | 6.42 | 21/25 | 84% | 64.5 | 80 |
| Oil 50% | Vol. | 50/50 | 1.0 | 0.50 | 6.42 | 17/25 | 68% | 21.4 | 160 |
| Water 40% | | | | | | | | | |
| HLB 9.2 | | | | | | | | | |
| Carbopol 934P | | | | | | | | | |
| Lanolin G-1471 5% | | 90/10 | 0.2 | 0.10 | 6.08 | 19/25 | 76% | 17.4 | 10 |
| Arlacel 40 5% | | 75/25 | 0.5 | 0.25 | 6.08 | 20/25 | 80% | 23.0 | 40 |
| Oil 50% | Vol. | 50/50 | 1.0 | 0.50 | 6.08 | 21/25 | 84% | 31.8 | 40 |
| Water 40 % | | | | | | | | | |
| HLB 11.4 | | | | | | | | | |
| Carbopol 934P | | | | | | | | | |
| Lanolin G-1441 5% | | 90/10 | 0.2 | 0.10 | 6.08 | 21/25 | 84% | 25.8 | 80 |
| Span 80 5% | | 75/27 | 0.5 | 0.25 | 6.08 | 22/25 | 88% | 38.1 | 80 |
| Oil 50% | Vol. | 50/50 | 1.0 | 0.50 | 6.08 | 20/25 | 80% | 22.4 | 40 |
| Water 40% | | | | | | | | | |
| HLB 9.1 | | | | | | | | | |
| Carbopol 934P | | | | | | | | | |
| Beeswax G-1702 5% | | 90/10 | 0.2 | 0.10 | 6.34 | 18/25 | 72% | 21.9 | 40 |
| Tween 81 5% | | 75/25 | 0.5 | 0.25 | 6.34 | 16/25 | 64% | 14.1 | 10 |
| Oil 50% | Vol. | 50/50 | 1.0 | 0.50 | 6.34 | 19/25 | 76% | 35.0 | 40 |
| Water 40% | | | | | | | | | |
| HLB 7.5 | | | | | | | | | |
| Carbopol 934P | | | | | | | | | |
| Brij 35 7% | | 90/10 | 0.2 | 0.10 | 6.34 | 19/25 | 76% | 36.4 | 40 |
| Brij 30 3% | | 75/25 | 0.5 | 0.25 | 6.34 | 19/25 | 76% | 28.4 | 40 |
| Oil 50% | Vol. | 50/50 | 1.0 | 0.50 | 6.34 | 16/25 | 64% | 14.8 | 40 |
| Water 40% | | | | | | | | | |
| HLB 14.4 | | | | | | | | | |
| Carbopol 934P | | | | | | | | | |
| Span 80 5% | | 90/10 | 0.2 | 0.10 | 6.08 | 16.25 | 64% | 7.6 | 10 |
| Arlacel 85 5% | | 75/25 | 0.5 | 0.25 | 6.08 | 21/25 | 84% | 30.2 | 80 |
| Water 50 % | Vol. | 50/50 | 1.0 | 0.50 | 6.08 | 16/25 | 64% | 9.55 | 40 |
| Oil 40% | | | | | | | | | |
| HLB 3.1 | | | | | | | | | |
| Carbopol 934P | | | | | | | | | |
| Tween 61 3% | | 90/10 | 0.2 | 0.10 | 6.25 | 18/25 | 75% | 17.8 | 20 |
| Arlacel 85 7% | | 75/25 | 0.5 | 0.25 | 6.25 | 18/25 | 72% | 21.5 | 20 |
| Water 50% | Vol. | 50/50 | 1.0 | 0.50 | 6.25 | 17/25 | 68% | 13.2 | 20 |
| Oil 40% | | | | | | | | | |
| HLB 4.2 | | | | | | | | | |
| Carbopol 934P 0.2 gm % | | | | | | | | | |
| Tween 61 4% | | 90/10 | 0.2 | 0.10 | 6.08 | 21/25 | 84% | 27.0 | 40 |
| Span 85 2% | | 75/25 | 0.5 | 0.25 | 6.08 | 24/25 | 96% | 38.0 | 80 |
| Arlacel 83 3% | Vol. | 50/50 | 1.0 | 0.50 | 6.08 | 25/25 | 100% | 38.0 | 160 |
| Water 50% | | | | | | | | | |
| Oil 40% | | | | | | | | | |
| HLB 5.4 | | | | | | | | | |
| Carbopol 934P 0.2 gm % | | | | | | | | | |
| Tween 61 1% | | 90/10 | 0.2 | 0.10 | 6.31 | 18/25 | 72% | 20.4 | 160 |
| Arlacel 83 2% | | 75/25 | 0.5 | 0.25 | 6.31 | 21/25 | 84% | 44.6 | 40 |
| Span 85 7% | Vol. | 50/50 | 1.0 | 0.50 | 6.31 | 21/25 | 84% | 45.7 | 40 |
| Water 50% | | | | | | | | | |
| Oil 40% | | | | | | | | | |
| HLB 3.0 | | | | | | | | | |
| Carbopol 934P 0.2 gm % | | | | | | | | | |
| Pluronics 10% | | 90/10 | 0.2 | 0.10 | 5.83 | 18/25 | 72% | 10.3 | 10 |
| Oil 50% | | 75/25 | 0.5 | 0.25 | 5.83 | 21/25 | 84% | 14.8 | 20 |
| Water 40% | Vol. | 50/50 | 1.0 | 0.50 | 5.83 | 18/25 | 72% | 6.75 | 10 |
| HLB 7.0 | | | | | | | | | |
| Carbopol 934P 0.2 gm % | | | | | | | | | |
| Carbowax 1540 10% | | 90/10 | 0.2 | 0.10 | 6.08 | 19/25 | 76% | 17.8 | 10 |
| Water 50% | Vol. | 75/25 | 0.5 | 0.25 | 6.08 | 25/25 | 100% | 38.0 | 80 |
| Oil 40% | | 50/50 | 1.0 | 0.50 | 6.08 | 19/25 | 76% | 20.4 | 40 |
| Carbopol 934P 0.2 gm % | | | | | | | | | |
| Miranol 10% | | 90/10 | 0.2 | 0.10 | 6.20 | 20/25 | 80% | 29.5 | 40 |
| Water 50% | Vol. | 75/27 | 0.5 | 0.25 | 6.20 | 15/25 | 60% | 30.9 | 20 |
| Oil 40% | | 50/50 | 1.0 | 0.50 | 6.20 | 19/25 | 76% | 21.0 | 40 |
| Carbopol 934P 0.2 gm % | | | | | | | | | |
| Vaccine without Adjuvant Encephalomyelitis (WEE) (titer 7.2) Antigen | | — | — | — | 6.34 | 12/75 | 48% | 5.14 | 10 |

In order to demonstrate the efficacy of the emulsion systems outlined in Example VI above, the following test was undertaken.

EXAMPLE VIII

I. CONDUCT OF CLOSTRIDUM TETANUS TOXOID IN VIVO TITRATION EXPERIMENT

A. Methods and Materials

1. Toxoid

A known antigenic strain of clostridium tetanus was grown, inactivated and purified according to conventional standard procedures. Nine experimental toxoids were prepared from a common batch for use with the adjuvants described below.

2. Emulsifiers

The standard adjuvant "HL" (Example III) employed in one test, and the emulsions numbered 6 through 12, inclusive, of Example VI were utilized in the remainder of the tests to produce adjuvants of varying compositions.

3. Adjuvant-Toxoids

Adjuvant-Toxoids were prepared by admixing 15 ml. of inactivated tetanus toxoid containing 200 LF/ml to 10 ml. of a given emulsion, 0.25 grams Carbopol 934P, followed by addition of qs. to 100 ml. with sterile water. The constituents of the adjuvant-toxoid systems tested are tabulated below:

ADjuvant-Toxoid Compositions[1]

| Adjuvant Toxoid | Emulsion Employed | Carbopol | Cottonseed oil | Span 20 | Tween 80 | Toxoid Antigen | Water |
|---|---|---|---|---|---|---|---|
| 1 | "HL"[2] | 0.25 | 5.00 | 0.25 | 0.25 | 15.00 | 79.25 |
| 2 | 7[3] | 0.25 | 2.5 | 0.25 | 0.25 | 15.00 | 81.75 |
| 3 | 8 | 0.25 | 3.5 | 0.25 | 0.25 | 15.00 | 80.75 |
| 4 | 9 | 0.25 | 4.5 | 0.25 | 0.25 | 15.00 | 79.75 |
| 5 | 10 | 0.25 | 5.5 | 0.25 | 0.25 | 15.00 | 78.75 |
| 6 | 11 | 0.25 | 6.5 | 0.25 | 0.25 | 15.00 | 77.75 |
| 7 | 12 | 0.25 | 7.5 | 0.25 | 0.25 | 15.00 | 76.75 |
| [4]8 | — | — | — | — | — | 15.00 | 85.00 |
| [5]9 | — | — | — | — | — | 15.00 | 75.00 |

[1]All data given in volume percent, based upon the total adjuvant-toxoid mixture as 100%.
[2]This sample consisted of adjuvant "HL" of Example III with 15 ml. toxoid antigen.
[3]The numbered emulsions 7–12 inclusive refers to identically numbered emulsions given in Example VI.
[4]Control containing only water and toxoid antigen.
[5]Control containing water, toxoid antigen and 10 % Al(OH)$_3$ as adjuvant therefor.

4. Conduct of Experiment

Groups of five guinea pigs (each pig weighing about 500 grams) were innoculated with 0.4 ml. each of the adjuvant-antigens and controls listed above. Six weeks after inoculation, all guinea pigs were bled by cardiac puncture and equal volumes of serum from each pooled. The pooled serum from each group was diluted 1:20, 1:40, 1:60, 1:80 and 1:100. Three ml. of each dilution was combined with 6 ml. of standard tetanus toxin which contains one test dose per two ml. The toxin-serum mixtures were held for one hour at room temperature to allow neutralization of the toxin to take place.

The toxin-serum mixtures from each group were thereafter inoculated into two guinea pigs, each receiving 3.0 ml. inoculum subcutaneously in the ventral flank region. The degree of immunity induced in each group for each dilution is expressed as 2, 4, 6, 8 and 10 antitocin units/ml., respectively, in the following table.

Titer Results

| [1]Group No. | Antitoxin units / ml. guinea pig sera |
|---|---|
| 1 | 8 |
| 2 | 6 |
| 3 | 2 |
| 4 | 2 |
| 5 | 2 |
| 6 | 4 |
| 7 | 8 |
| 8 | 1 |
| 9 | 2 |

[1]Group numbers herein correspond to the "Adjuvant-Toxoid" preparation numbers of the table immediately above.

All of the experimental adjuvant-toxoid antigen formulations (Nos. 1–7 inclusive) produced at least 2 antitoxin units/ml. in the guinea pigs, showing at least a two to tenfold increase in antibody titer above that obtained with control preparation 8 containing no adjuvant. Similarly, the adjuvant-antigen combinations hereof yielded at least as good, and in several cases better results than preparation 9 employing Al(OH)$_3$ as adjuvant.

It is to be understood that all of the emulsions systems listed in Example VI likewise yield beneficial results to a greater or lesser degree when employed in an adjuvant in accordance with the invention. Hence, the efficacy tests described are only exemplary of the results obtainable through the use of the widely varying emulsion systems of Example VI.

Further specific examples (Nos. IX-XII inclusive) of antigenic compositions containing the preferred adjuvant of Example III are set forth hereunder along with tests supporting the potentiated results obtained from the use of such adjuvant.

EXAMPLE NO. IX.

CLOSTRIDIUM CHAUVOEI SEPTICUM BACTERIN

1. PREPARATION OF BACTERIA

Several known antigenic strains of the species above were grown and inactivated according to conventional standard procedures.

2. PREPARATION OF EXPERIMENTAL BACTERINS

Six experimental bacterins were prepared as follows from a production batch:

| Lot No. | Sublot | Description |
|---|---|---|
| 3 | A | 200 ml. of inactivated bacterial suspension was allowed to settle. 20 ml. of supernate was siphoned off and |

-continued

| Lot No. | Sub-lot | Description |
|---|---|---|
|  |  | replaced with 20 ml. of adjuvant "HL". |
| 3 | B | 200 ml. of formalin-inactivated bacterial suspension was centrifuged at 2500 rpm. The supernate was discarded. To the packed cells adjuvant "HL" was added to restore the product to its original volume (200 ml.). |
| 3 | C | 200 Ml. of inactivated product was allowed to settle. 100 ml. was siphoned off. The 100 ml. of supernate was used as fluid base for Carbopol 934P constituent in the adjuvant "HL". The 100 ml. of complete adjuvant containing the supernate was added to the product, restoring to original volume. |
| 3 | D | 200 ml. of inactivated product was allowed to settle, and 20 ml. of supernate was siphoned off. To 180 ml. of product, 20 ml. of 1% alum phosphate was added to bring the final volume to 200 ml. |
| 3 | E | 200 ml. of product without any adjuvant or concentration. |
| 3 | F | 200 ml. of product concentrated to 100 ml. with alum. |

3. CONDUCT OF EXPERIMENT 350 to 450-gram guinea pigs were used in the test, divided into 16 groups of 5 guinea pigs each. Two of the groups of 5 guinea pigs each were set aside as controls. Each sublot was broken down into two groups of 5 guinea pigs each. Each group of guinea pigs (except controls) was then inoculated subcutaneously with 0.25 cc and 0.5 cc (each sub-lot contained one group which received 0.25 cc and one group that received 0.5 cc) bacterin. Seven days later, all principals received a booster inoculation. Fourteen days later all principals and controls received a $10LD_{80}$ dose of standard Clostridium chauvoei "F" spore.

4. RESULTS

| Lot No. | Sub Lot | *A/P 0.25 cc | *A/P 0.5 cc | % Survival 0.25 cc | % Survival 0.5 cc |
|---|---|---|---|---|---|
| 3 | A | 2/5 | 2/4 | 40% | 50% |
| 3 | B** | 4/5 | 5/5 | 80% | 100% |
| 3 | C** | 4/5 | 5/5 | 80% | 100% |
| 3 | D | 2/5 | 2/5 | 40% | 40% |
| 3 | E | 2/5 | 3/5 | 40% | 60% |
| 3 | F** | 3/5 | 5/5 | 60% | 100% |
| Controls | Challenge material | — | 1:50,000 —0/5 |  | 0% |
| Controls | Challenge | — | 1:500,000 —1/5 |  | 20% |

*Alive over Principals challenged
**Sub-lots B and C were made from unconcentrated material, and sub-lot F was concentrated 50% with alum.

EXAMPLE NO. X.

CLOSTRIDIUM PERFRINGENS TYPE "C" TOXOID

1. PREPARATION OF TOXOID

Clostridium perfringens type "C" was grown and inactivated according to conventional production procedures. The cells were removed by centrifugation and the supernate was filtered through a sterilizing bacteriological filter.

2. PREPARATION OF EXPERIMENTAL TOXOID 15 liters of toxoid was divided into five 3-liter batches and treated in the following manner:

| Lot No. | Sub-Lot | Description |
|---|---|---|
| 2 | A | 3 liters of "C" toxoid containing 10% adjuvant "HL" |
| 2 | B | 3 liters of "C" toxoid containing 50% adjuvant "HL" (1500 ml. toxoid + 1500 ml. adjuvant "HL" |
| 2 | C | 3 liters of "C" toxoid containing 10% $Al(OH)_3$. |
| 2 | D | 3 liters of "C" toxoid, No adjuvant was added. |
| 2 | E | 3 liters of "C" toxoid bacterin (containing cells) was concentrated to 1500 ml. with $Al(OH)_3$. |

3. CONDUCT OF EXPERIMENT

Twenty-five adult, 4-lb. rabbits were used in the test, divided into five groups of 5 rabbits each. Each group of rabbits was then inoculated subcutaneously with 2 cc. of one of the five sub-lots. Fourteen days later each rabbit received a 2 cc. booster vaccination. Fourteen days after the secondary inoculation, all the rabbits were bled by heart puncture and the serum from each sub-lot was pooled. A toxinantitoxin assay to determine units of titer present in the hyperimmunized serum was conducted in 18 to 20-gram white mice.

4. RESULTS

| Lot No. | Sub-Lot | 20 A.U.* | 30 A.U. | 40 A.U. | 50 A.U. | 60 A.U. | Units Obtained |
|---|---|---|---|---|---|---|---|
| 2 | A | 5/5** | 5/5 | 5/5 | 5/5 | 0/5 | 50 A.U. |
| 2 | B | 5/5 | 5/5 | 5/5 | 4/5 | 0/5 | 40 A.U. |
| 2 | C | 5/5 | 5/5 | 5/5 | 3/5 | 0/5 | 40 A.U. |
| 2 | D | 4/5 | 3/5 | 0/5 | 0/5 | 0/5 | 20 A.U. |
| 2 | E | 5/5 | 5/5 | 5/5 | 5/5 | 0/5 | 50 A.U. |
| Controls - 10L+ |  |  |  |  |  | 1/5 |  |
| Controls - 10Lo |  |  |  |  |  | 5/5 |  |

*International Antitoxin Units
**Alive over Principals.

EXAMPLE XI.

LEPTOSPIRA ICTEROHEMORRHAGIAE CANICOLA BACTERIN

1. PREPARATION OF BACTERIA

The two species of Leptospira were grown separately and inactivated according to conventional production procedures. The bacterial suspensions were concentrated and the supernate discarded. Concentrated cells were reconstituted with 0.85 percent saline.

2. PREPARATION OF EXPERIMENTAL BACTERIN

Antigen was obtained from a single production lot and divided into equal volumes.

| 1. | Leptospira Icterohemorrhagiae Canicola Bacterin | 50% |
|---|---|---|
|  | Adjuvant "HL" | 50% |
| 2. | Leptospira Icterohemorrhagiae Canicola Bacterin | 50% |
|  | Aluminum hydroxide | 40% |

The test was a comparison of the antibody (agglutinins) response in guinea pigs of these two experimental bacterins. Six guinea pigs were used for each of the preparations. The dose per animal was 1.0 ml. injected subcutaneously. Preinoculation sera were negative. Sera taken three weeks post inoculation were tested by the agglutination-lysis test with the following results:

| Guinea Pig No. | Adjuvant | ICTEROHEMORRHAGIAE ||||| CANICOLA |||||
|---|---|---|---|---|---|---|---|---|---|---|---|
| | | 1:10 | 1:50 | 1:250 | 1:1250 | 1:6250 | 1:10 | 1:50 | 1:250 | 1:1250 | 1:6250 |
| 1 | Adjuvant "HL" | 4+ | 3+ | 2+ | — | — | 4+ | 4+ | 3+ | 2+ | 1+ |
| 2 | Adjuvant "HL" | 4+ | 4+ | 2+ | 2+ | — | 4+ | 4+ | 4+ | 3+ | 1+ |
| 3 | Adjuvant "HL" | 3+ | 3+ | 1+ | — | — | 4+ | 4+ | 3+ | 1+ | 1+ |
| 4 | Adjuvant "HL" | 3+ | 2+ | 2+ | 1+ | — | 4+ | 3+ | 2+ | — | — |
| 5 | Adjuvant "HL" | 4+ | 2+ | 1+ | — | — | 4+ | 2+ | 2+ | 1+ | — |
| 6 | Adjuvant "HL" | 4+ | 3+ | 3+ | 2+ | — | 4+ | 3+ | 1+ | — | — |
| 7 | Al(OH)$_3$ | 4+ | 2+ | 1+ | — | — | 3+ | 2+ | — | — | — |
| 8 | Al(OH)$_3$ | 2+ | 1+ | — | — | — | 4+ | 4+ | 2+ | — | — |
| 9 | Al(OH)$_3$ | 3+ | 1+ | — | — | — | 4+ | 2+ | + | + | — |
| 10 | Al(OH)$_3$ | 3+ | 2+ | 1+ | — | — | 3+ | 1+ | — | — | — |
| 11 | Al(OH)$_3$ | 2+ | 1+ | 1+ | — | — | 3+ | 1+ | 1+ | — | — |
| 12 | Al(OH)$_3$ | 4+ | 2+ | — | — | — | 4+ | 3+ | 1+ | — | — |

EXAMPLE XII

BIVALENT ENCEPHALOMYELITIS VACCINE, TCO

1. PREPARATION OF VIRUS

Encephalomyelitis virus strains, *Massachusetts EEE and Rockefeller WEE, were harvested from tissue culture fluid following conventional standard procedures. The tissues culture fluid was inactivated with formalin and stored at plus 5° C.

*Massachusetts eastern equine encephalomyelitis and Rockefeller western equine encephalomyelitis.

2. PREPARATION OF EXPERIMENTAL VACCINES

A single lot of inactivated virus was divided into three equal volumes. Three experimental vaccines were prepared as follows:

| Lot No. | Sub-Lot | Description |
|---|---|---|
| 1 | A | 9 ml. of EEE inactivated tissue culture fluid and 9 ml. of WEE inactivated tissue culture fluid were combined with 2 ml. of twenty percent (20%) of hydrolyzed gelatin. |
| 1 | B | 10 ml. of EEE inactivated tissue culture fluid and 9 ml. of WEE inactivated tissue culture fluid were combined with 2 ml. of ten percent (10%) adjuvant "HL". |
| 1 | C | 10 m. of EEE inactivated tissue culture fluid and 10 ml. of WEE inactivated tissue culture fluid were combined without an adjuvant. |

3. CONDUCT OF EXPERIMENT

Twenty-five 350-to-400 gram guinea pigs were used in the test, divided into five groups of 5 each. Two groups were set aside as controls.

Three groups of guinea pigs were inoculated subcutaneously with two 0.5 ml. of one of the three experimental vaccines one week apart and challenged ten days after the second vaccination with 0.1 ml. I. C. (Intracranially) of heretologous virus material diluted 10-5.

4. RESULTS

The challenge virus titration of EEE strain was between 1 and 10 guinea pig $LD_{50}$.

| EEE Fraction Only | Alive Over Principals | % Survival |
|---|---|---|
| Vaccine A (gelatin) | 4/5 | 80% |
| Vaccine B (10% adjuvant "HL") | 5/5 | 100% |
| Vaccine C (no adjuvant) | 2/5 | 40% |
| Controls: 10-$^5$ | 0/5 | 0% |
| Controls: 10-$^6$ | 2/5 | 40% |

**The Western test was terminated as a "no test" prior to completion due to respiratory or non-specific disease in the test animals.

The following tests were undertaken to demonstrate that the adjuvants hereof may be employed as a diluent for live modified or dessicated live modified virus vaccines to reconstitute or restore the same and provide sufficient circulating antibody titer for the protection of vaccinated animals.

EXAMPLE XIII

INFECTIOUS BOVINE RHINOTRACHEITIS VACCINE

I. Preparation of Virus

A known antigenic strain of Infectious Bovine Rhinotracheitis virus (IRB) was grown in Bovine emlyonin Kidney cells. The virus was harvested and dissicated according to conventional procedures.

II. Preparation of Adjuvant

Adjuvant in accordance with the invention was prepared using 1.00 ml. of standard emulsifier "0" (45 ml. cottonseed oil, 50 ml. $H_2O$, 2.5 ml. Span 20, 2.5 ml. Tween 80), 0.20 grams Carbopol 934P and 98.80 ml. of distilled water.

III. Preparation of Vaccine

Vaccines were prepared in accordance with the following schedule:

No. 1: 287 milligrams of dessicated IBR virus was reconstituted in 50 ml. of the above adjuvant No. 2: 287 milligrams of dessicated IBR virus was reconstituted in 50 ml. of sterile distilled water to produce a control IV. Conduct of Experiment Each of two IBR susceptible calves (No. 9 and 69) weighing approximately 900 lbs. each were injected subcutaneously with 2.0 ml. of IBR-adjuvant vaccine No. 1. For comparative purposes one IBR susceptible calf (No. 67) was likewise injected with 2.0 ml. of the IBR - water control No. 2. After 14 days each of the three calves were bled by venous puncture, and the red blood cells of each sample were separated from serum by centrifuging. A serum neutralization test was conducted on each serum sample to determine the antibody titer/ml. induced by the experimental vaccines. The results of these tests are tabulated below:

| Animal No. | Antibody units/ml. Calf Sera |
|---|---|
| 9 | 1:15 |
| 69 | 1:18 |
| 67 (Control) | 1:2 > 1:4 |

The foregoing results are especially significant by virtue of the fact that IBR virus is known to produce only low levels of circulating antibody titer in vaccinated cattle when used alone. As demonstrated above however, IBR virus in conjunction with the adjuvants hereof used as a diluent to reconstitute the same yield dramatically increased circulating antibody titers. This is believed to occur because of the depot effect alluded to above.

EXAMPLE XIV

CANINE DISTEMPER VACCINE

I. Preparation of Virus

A known antigenic strain of Canine Distemper Virus was grown in primary chicken cells. The virus was harvested and dessicated according to conventional standard procedures.

II. Preparation of Adjuvant

Adjuvant in accordance with the present invention was prepared using 1.00 ml. standard emulsifer "0" (45 ml. cottonseed oil, 50 ml. $H_2O$, 2.5 ml. Span 20, 2.5 ml. Tween 80), 0.25 grams Carbopol 934P and 98.75 ml. distilled water.

III. Preparation of Vaccine

Vaccines were prepared in accordance with the following schedule:

No. 1: 132 milligrams of dessicated Canine Distemper virus was reconstituted in 2 ml. of the above adjuvant.

No. 2: 132 milligrams of dessicated Canine Distemper virus was reconstituted in 2 ml. of sterile distilled water.

IV. Conduct of Experiment

Each of four dogs (Nos. 960, 963, 966, and 974) were injected subcutaneously with 1.0 ml. of the reconstituted vaccine No. 1. For comparative purposes, four other dogs (Nos. 961, 964, 965 and 975) were injected subcutaneously with water reconstituted control vaccine No. 2. After 21 days the dogs were bled by venous puncture and the sera was obtained. A serum neutralization test was conducted on the pooled serum samples from each group of dogs to determine the antibody titer / ml. of sera induced by the experimental vaccines. The results of these tests are collected below:

| | Animal No. | Antibody titer / ml. dog sera |
|---|---|---|
| | 960 | 1:1290 |
| | 963 | 1:1290 |
| | 966 | 1:692 |
| | 974 | 1:1290 |
| (Control) | 961 | 1:2830 |
| | 964 | 1:1410 |
| | 965 | 1:646 |
| | 975 | 1:800 |

It is to be understood that the foregoing Example is illustrative of the use of the present adjuvants as diluents, but that comparative results between the adjuvant - antigen vaccines and Controls are not indicative of efficacy. This stems from the fact that with Canine Distemper virus, a very large number of test animals would be required in order to conclusively demonstrate efficacy levels since individual dogs react differently to the virus. However, the above data does domonstrate that the present adjuvants can be utilized as a diluent with Canine Distemper MLV without deleteriously effecting the virus itself.

EXAMPLE XV

CARBOPOL 934P TITRATION WITH EPINEPHRINE

Equal amounts of Carbopol 934P and Epinephrine, both at 1:1000 strength were combined and 0.15 cc doses injected into the ears of rabbits close to the posterior auricular vein. It was found that the Carbopol 934P bound the Epinephrine, but released it after three hours and continued releasing the material for about 24 hours. Measurement was made by counting the branches of the central artery visible when a light was placed behind the ear. In contrast when plain Epinephrine was injected in equal amounts, the effect started immediately and lasted from two to three hours. These tests at least partly verify the fact that amino compounds such as Epinephrine bind to Carbopol 934P and are then released slowly in a physiological environment of approximately pH 7.4.

Similar tests were conducted on erysipelas bacterin with equivalent results being obtained.

Although not described in detail above, it is to be understood that in preparation of an injectable medicinal composition in accordance with this invention, the pH of the solution is preferable brought to substantially 7.0 by addition of sodium hydroxide thereto if necessary since the complexing resin gives a pH of about 4.

Having thus described the invention what is claimed as new and desired to be secured by letters Patent is:

1. A liquid injectable antigenic antibody producing immunogen composition comprising:
   an injectable antigenic substance; and
   a sufficient amount of adjuvant for said antigenic antibody producing immunogen substance to increase the residual effectiveness thereof, said adjuvant including a polymer of acrylic acid crosslinked with polyallyl sucrose, and an emulsion system (based on a volume percentage basis totaling 100 percent) including a water and oil emulsion carrier comprised of at least about 25 percent to 85 percent by volume nontoxic vegetable oil, at least about 14 percent by volume water, and a nontoxic stable emulsion producing amount of a surfactant, said surfactant being present in an amount ranging from about 1 to 20 percent by volume and being selected from the group consisting of nonionic and amphoteric nontoxic surfactants,
   there being from about 0.1 to 1 gram percent weight to volume of said polymer and from about 1 to 10 percent volume to volume of said emulsion system in said adjuvant.

2. An injectable antigenic composition as set forth in claim 1 wherein said antigenic antibody producing substance is an immunogen.

3. An injectable antigenic composition as set forth in claim 2 wherein said immunogen substance is a bacterial type antigen.

4. An injectable antigenic composition as set forth in claim 2 wherein said substance is a toxoid type antigen.

5. An injectable medicinal antigenic composition as set forth in claim 2 wherein said substance is a viral type antigen.

6. An injectable medicinal antigenic composition as set forth in claim 5 wherein said substance is IBR virus.

7. An injectable antigenic composition as set forth in claim 1 wherein a drug or tracer dye is included with said injectable antigenic antibody producing immunogen substance.

8. An injectable antigenic composition as set forth in claim 1 wherein said substance is a toxoid.

9. An injectable antigenic composition as set forth in claim 1 wherein said carrier comprises an oil in water emulsion.

10. An injectable antigenic composition as set forth in claim 1 wherein said carrier comprises a water in oil emulsion.

11. An injectable antigenic composition as set forth in claim 1 wherein said nonionic surfactant is selected from the group consisting of sorbitan monooleate, polyoxyethylene sorbitan monooleate, sorbitan monolaurate, polyoxyethylene stearate, sorbitan monopalmitate, sorbitan monostearate, sorbitan trioleate, polyoxyalkylene sorbitol lanolin derivatives, polyoxyalkylene lanolin derivatives, polyoxyalkylene sorbitol beeswax derivatives, polyoxyethylene sorbitol, polyoxyethylene lauryl ethers, polyethylene glycols, and mixtures thereof, and said carrier comprises an oil in water emulsion.

12. An injectable antigenic composition as set forth in claim 1 wherein said nonionic surfactant is selected from the group consisting of sorbitan monooleate, sorbitan trioleate, sorbitan sesquioleate, polyoxyethylene sorbitan monostearate. sorbitan monolaurate, polyethylene glycols, and the addition product of ethylene oxide to propylene glycols, and mixtures thereof, and siad carrier comprises a water in oil emulsion.

13. An injectable antigenic composition as set forth in claim 1 wherein said amphoteric surfactant is an ampholytic, fatty acid derived surfactant capable of dispersing oil in water.

14. An injectable antigenic composition as set forth in claim 1 wherein said amphoteric surfactant comprises

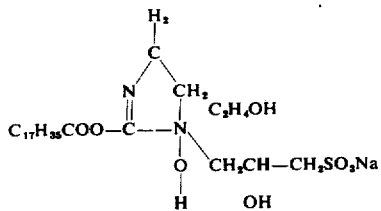

and said carrier comprises an oil in water emulsion.

15. An injectable antigenic composition as set forth in claim 1 wherein the non-toxic vegetable oil in said oil and water emulsion is selected from the group consisting of cottonseed oil, olive oil and peanut oil.

16. An injectable antigenic composition as set forth in claim 1 wherein is further included reconstituted collagen or gelatin adjuvant.

17. An injectable antigenic composition as set forth in claim 16 wherein said ingredient is reconstituted collagen.

18. An injectable antigenic composition as set forth in claim 16 wherein said ingredient is gelatin.

19. An injectable antigenic composition as set forth in claim 16 wherein said antigen is an inactivated virus or bacterin.

20. An injectable antigenic composition as set forth in claim 16 wherein said antigen is an inactivated bacterin or toxoid derived from bacteria.

21. An injectable antigenic composition as set forth in claim 17 wherein for each one part by volume of said emulsion system, there is provided 0.2 gram % weight to volume of said polymer and 20 parts by volume of reconstituted collagen.

22. An injectable antigenic composition as set forth in claim 16 wherein said antigen is an inactivated equine encephalomyelitis virus.

23. An injectable antigenic composition as set forth in claim 16 wherein said antigen is an inactivated bivalent western and eastern equine encephalomyelitis virus.

24. An injectable antigenic composition as set forth in claim 1 wherein said emulsion system includes oil in water emulsion carrier and the surfactant or surfactants used therein have an effective HLB number above 6.

25. An injectable antigenic composition as set forth in claim 1 wherein said emulsion system includes a water in oil emulsion carrier and the surfactant or surfactants used therin have an effective HLB number below 6.

26. An injectable antigenic composition as set forth in claim 1 wherein is provided from about 10 percent to about 90% of said adjuvant with respect to the antigenic antibody producing immunogen substance on a volume to volume basis.

27. An injectable antigenic composition as set forth in claim 1 wherein is provided about 25 percent of said adjuvant with respect to the substance on a volume to volume basis.

28. A process for producing antibodies in the body of a mammal at a controlled rate comprising injecting into the mammal a quantity of a liquid antigenic composition including:

an injectable antibody producing antigenic substance; and a sufficient amount of adjuvant for said antigenic antibody producing immunogen substance to increase the residual effectiveness thereof, said adjuvant including a polymer or acrylic acid cross-linked with pollyallyl sucrose, and an emulsion system (based on a volume percentage basis totaling 100%) including a water and oil emulsion carrier comprised of at least about 25 percent to 85 percent by volume nontoxic vegetable oil, at least about 14 percent by volume water, and a nontoxic stabile emulsion producing amount of a surfactant, said surfactant being present in an amount ranging from about 1 to 20 percent by volume and being selected from the group consisting of nonionic and amphoteric nontoxic surfactants, there being from about 0.1 to 1 gram percent weight to volume of said polymer and from about 1 to 10 percent volume to volume of said emulsion system in said adjuvant.

29. A process for producing antibodies in the body of a mammal by injecting therein an injectable antibody producing antigenic immunogen substance as set forth in claim 28 wherein is provided from about 10% to about 90 percent of said adjuvant with respect to the substance on a volume to volume basis.

30. A process for producing antibodies in the body of a mammal by injecting therein an injectable antibody antigenic immunogen substance as set forth in claim 28 wherein is provided about 25 percent of said adjuvant with respect to the substance on a volume to volume basis.

* * * * *